UNITED STATES PATENT OFFICE.

NIELS R. FINSEN, OF COPENHAGEN, DENMARK.

PROCESS OF MAKING HÆMATIN ALBUMEN.

SPECIFICATION forming part of Letters Patent No. 544,912, dated August 20, 1895.

Application filed May 22, 1895. Serial No. 550,263. (No specimens.) Patented in Sweden October 25, 1894, No. 8,586.

*To all whom it may concern:*

Be it known that I, NIELS RYBERG FINSEN, of Copenhagen, Denmark, have invented certain new and useful Improvements in the Process of Preparing Hæmatin Albumen, of which the following is a specification, and for which I have received a patent in Sweden, issued October 25, 1894, No. 5,586.

This invention relates to the production of a new product which may be designated as "hæmatin albumen," being a particular composition of hæmoglobin and serum albumen, which substances possess nutritious properties of great value and may by my invention be used as food, which has not hitherto been possible with compositions of hæmoglobin or blood albumen. The new product is, moreover, susceptible of conservation for a long period without liability of becoming deteriorated, and it is therefore suitable as an article of commerce. It was mainly the disagreeable after-taste left by the composition hitherto produced which made it impossible to use them as food, this after-taste being invariably followed by nausea. The new composition of this invention is quite free from any such after-taste, which result is attained by making use of citric acid or some other acid which does not prevent the albumen from being coagulated when used in a proper diluted condition, and which will also not be injurious to health.

For the production of hæmatin albumen I take the fresh blood of oxen (or of some other animal) and defibrinate it by whipping. This blood being now freed from fibrin is then to be mixed with six times its bulk of water, to which is added a small quantity of citric acid, (say five grams per litre of blood.) The mixture is then to be heated to about 90° centigrade and kept at this temperature for about a quarter of an hour. The albumen, which by this process will be converted into coagulated albumen, must now be strained and then very carefully washed with water. The superfluous liquid having been then extracted, the remaining mass is dried at a temperature of 45° centigrade *in vacuo*. The brittle mass thus produced is then of a brown (chocolate-like) color, but tasteless. Finally, this mass is to be pounded and ground to a very fine powder.

Having thus described my invention, I claim as new and desire to secure by Letters Patent—

1. The herein-described process for the production of hæmatin-albumen, which consists in mixing diluted defibrinated blood with an acid, coagulating the albumen by heating it to about 90° centigrade and washing the albumen with water, then drying it by extracting the water, and heating the product *in vacuo* at 45° centigrade and lastly pounding the brittle mass obtained and grinding it to a fine powder.

2. The herein-described process for the manufacture of a food product, which consists in mixing defibrinated blood with an acid, coagulating, washing and drying the albumen, heating the product *in vacuo*, and finally powdering it, substantially as described.

In testimony that I claim the foregoing as my invention have signed my name in presence of two subscribing witnesses.

NIELS R. FINSEN.

Witnesses:
CHARLES GUDE,
ROSS J. KIRK.